April 4, 1939.    J. CASTONGUAY    2,152,838
COUNTER MOLDING MACHINE
Filed Feb. 15, 1938
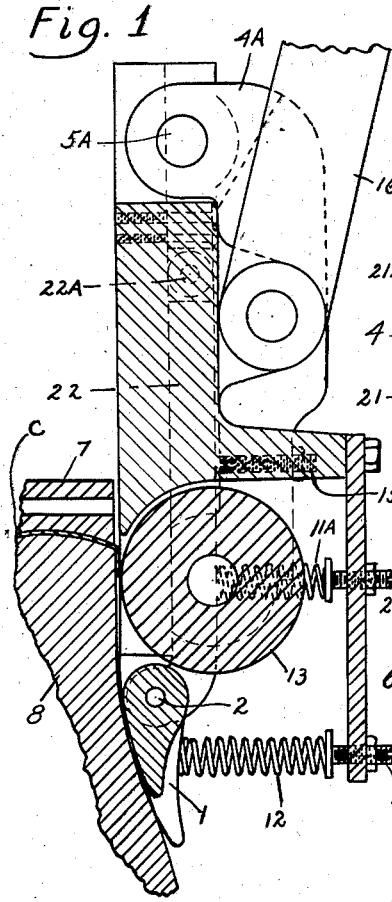
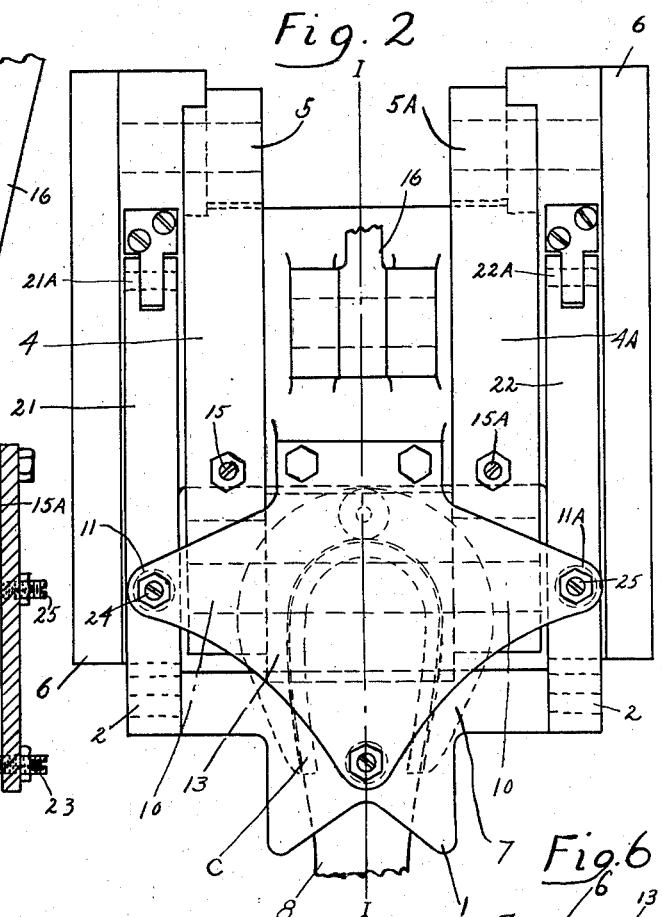
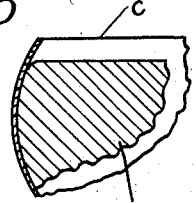
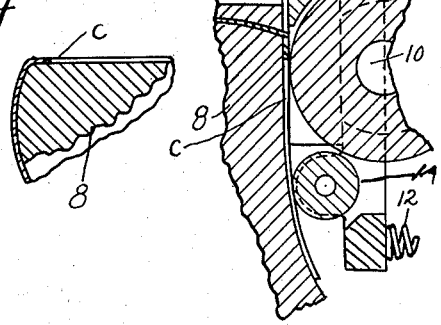
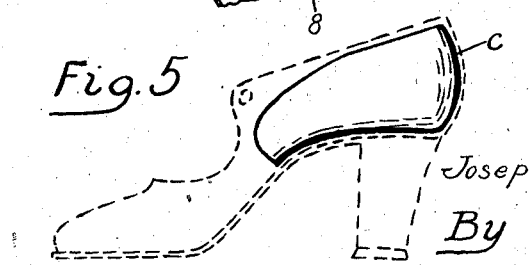
Joseph Castonguay Inventor
By Leo H. Tracy.
Attorney Patented Apr. 4, 1939

2,152,838

UNITED STATES PATENT OFFICE 2,152,838

COUNTER MOLDING MACHINE

Joseph Castonguay, Salem, Mass., assignor of one-third to Albert Castonguay, and one-third to William Castonguay, both of Salem, Mass.

Application February 15, 1938, Serial No. 190,616

1 Claim. (Cl. 12—66)

The present invention relates to the manufacture of molded counters for shoes. It has to do with the mechanism of that part of a counter molding machine which turns over and irons or rolls down the flange, and which is commonly called the "wiper".

The proper manufacture of counters has been one of the most important features of the shoe industry. Almost every style of shoe requires a different and particular type of counter, and especially the various types of women's shoes. The trade requires everything from short counters with straight flanges in a single plane to counters with long curved flanges. There are slipper counters which require a flat flange to the extreme tip of the counter, and there are curved counters which are used in practically all women's shoes; regular pump counters, cut out counters, arch fit counters, the latter used in women's high heel shoes; and men's, boys', youths', little girls', misses', children's, and infants' counters. At the present time it is necessary to remove and change the wiper on the molding machine in order to manufacture each distinct type of counter. This necessarily requires considerable inconvenience and loss of time.

The present invention furnishes a so-called wiper with adjustable mechanism in order that it can be used to make any type of counter required.

It can be used with equal effectiveness on the old as well as the most modern machines. It matters not whether the metal lasts and molds are convexed or have their surfaces in a single plane. Also there has been considerable damage to counters because of the irregular pressure in turning the flange, and it has been necessary in other types of wipers for the operator to stop his machine and pack the back of the mold and last with tin disks in order to maintain a uniform pressure on the flange. A damaged or shredded flange on the counter will greatly injure the shoe. At the present time there is a big trade demand for women's long curved counters with a cloth or compound covering. To turn the flange on such counters, and to keep the shredding of the edges down to a minimum has been a serious problem with all counter manufacturers. It is impossible to accomplish this with the friction or rubbing wipers in use. This invention supplies a wiper with rolls and spring adjustments, which can maintain any required pressure and which positively will not shred the most delicate counter covering material.

The object of this invention is to provide simple and appropriate means for the manufacture of various types of counters without removing the wiper from the machine, and one which can be used on any of the usual commercial counter molding machines.

Another object of the invention is to provide a wiper which can maintain an uniform pressure upon the turned flange of a counter and one which will not shred the edges.

Still another object of the invention is to provide a flange turning mechanism that will minimize wear and tear on the counter molding machine, by utilizing a rotating pressure instead of a rubbing pressure, and at the same time exert greater force without burning the counter flange.

A still further object of the invention is to provide counter molding apparatus with adjustable parts, so that the pressure of the same wiper rolls may be exerted upon a last with a convex forward surface as well as upon a straight surface lying within the same plane.

With these objects in view the invention consists in certain details of construction and combination of parts, as will be hereinafter, described and claimed.

In the accompanying drawing,

Figure 1 is a sectional view taken on line 1—1 in Figure 2.

Figure 2 is a plan view of the device.

Figure 3 shows the form with the counter before the latter is molded.

Figure 4 shows the form with the counter after the latter is molded.

Figure 5 is a side elevation of a counter molded by means of the present invention and applied to the shoe.

Figure 6 is a sectional view showing a modification, wherein the small wiper is replaced by a small roller.

Throughout the various views of the drawing similar reference characters designate similar parts.

In the preferred embodiment of the invention, referring to the drawing, a wiper 1 is hinged on a fulcrum 2 which is in arms 21 and 22 and hinged at 21A and 22A on the slide 6. Spring 12 applies pressure to the wiper 1 and springs 11 and 11A apply pressure to arms 21 and 22. This construction gives wiper 1 a double joint which allows said wiper 1 to lay against the work so that the entire working surface is acting at all times. The springs 12, 11 and 11A are adjustable by means of adjusting screws 23, 24, and 25 respectively.

A roll 13 which runs free on a spindle 10 is placed behind the wiper 1, and said spindle 10 is carried in arm 4 and 4A pivoted at shafts 5 and 5A which in turn is supported on the slide 6. The pressure that is applied by the roll 13 is adjusted by means of screws 15 and 15A. Arm 16 is a connecting rod which is attached to the crank mechanism and operates the slide 6 up and down.

After form 8, which may have a convexed surface as shown in Figures 1 and 6, or a surface which lies in the same plane as shown in Figures 3 and 4, has a counter blank which is to be molded into shape, placed upon it as shown in Figure 3, a clamp or side mold 7 is fixed around said form 8 and counter blank C to hold the latter in place while being molded. A treadle is then tripped and the head on slide 6 comes into contact with the work. First the wiper 1 as shown in Figure 1, or the small roll 1A as shown in Figure 6, comes in contact with the work and then the large roll 13 exerts the necessary pressure.

Various modifications may be made in the structure of my device without departing from the spirit of my invention, and I therefore reserve the right to make such changes as come within the scope of the claim.

Having thus described my invention, what I claim is new and desire to protect by Letters Patent is:

Instruments for molding shoe counters with a curve at their wing extremities, comprising cooperating complemental last member, the counter flange-sustaining surface of which last member is outwardly curved in the part flanked by the wing extremity of a counter in the process of being molded, a roll presser adapted to roll across the flange-supporting face of the last, adjustable spring and screw members attached to the roll presser to regulate the force of the roll against the last during its operative movement, a smaller roll presser having adjustable spring pressure members and adapted to travel in advance of said larger roll, and a carrier to which the said rolls are attached and by means of which they are worked.

JOSEPH CASTONGUAY.